United States Patent [19]

Candy

[11] Patent Number: 5,347,562
[45] Date of Patent: Sep. 13, 1994

[54] SYNCHRONIZING GROUPS OF BASE STATIONS IN TIME DIVISION DUPLEX COMMUNICATION SYSTEMS

[75] Inventor: Edwin R. Candy, Cambridge, England

[73] Assignee: Hutchinson Personal Communications Limited, Cambridge, England

[21] Appl. No.: 71,862

[22] Filed: Jun. 2, 1993

Related U.S. Application Data

[63] Continuation of Ser. No. 671,846, Apr. 12, 1991, abandoned.

[30] Foreign Application Priority Data

Aug. 18, 1989 [GB] United Kingdom ............... 8918908

[51] Int. Cl.$^5$ ............................................ H04M 11/00
[52] U.S. Cl. ........................................ 379/58; 379/61; 455/51.1; 455/70; 455/88
[58] Field of Search ............................. 379/58, 61, 63; 455/51.1, 57.1, 69, 70, 88, 51.2; 358/85

[56] References Cited

U.S. PATENT DOCUMENTS

| | | | |
|---|---|---|---|
| 2,509,237 | 5/1950 | Labin et al. | 455/57.1 |
| 4,117,405 | 9/1978 | Martinez | 455/51.1 |
| 4,414,661 | 11/1983 | Karlstrom | 455/51.1 |
| 4,513,415 | 4/1985 | Martinez | 379/63 |
| 4,651,330 | 3/1987 | Ballance | 455/51.1 |
| 4,935,927 | 6/1990 | Kaewell, Jr. et al. | 455/51.1 |
| 5,103,448 | 4/1992 | Barnes | 379/61 |

FOREIGN PATENT DOCUMENTS 2110055  6/1983  United Kingdom .

OTHER PUBLICATIONS

MPT 1375, "Common Air Interface Specification", Department of Trade and Industry, London, May 1989, pp. i-4-26.

Primary Examiner—Curtis Kuntz
Assistant Examiner—Dwayne D. Bost
Attorney, Agent, or Firm—Laurie E. Gathman; Anne E. Barschall

[57] ABSTRACT

A telephone system in which communication between fixedly sited primary stations and transportable secondary stations is by way of respective time division duplex (TDD) radio links, particularly single frequency TDD links. In order to reduce radio interference between closely sited primary stations, their transmit periods are frame synchronized by using an externally produced radio signal. Conveniently a broadcast television field synchronization signal can be used.

9 Claims, 2 Drawing Sheets

5,347,562

SYNCHRONIZING GROUPS OF BASE STATIONS IN TIME DIVISION DUPLEX COMMUNICATION SYSTEMS

This is a continuation of application Ser. No. 07/671,846, filed on Apr. 12, 1991, abandoned.

TECHNICAL FIELD

The present invention relates to a method of, and primary station for, operating a telephone system in which communication between fixedly sited primary stations and transportable secondary stations is by way of time division duplex (TDD) radio links, more particularly single frequency TDD links.

BACKGROUND ART

A particular, but not exclusive, example of such a telephone system is the Second Generation Cordless Telephone (CT2), otherwise known as the Telepoint system. The common air interface specification for CT2 has been published as MPT 1375 by the Department of Trade and Industry, London 1989. In order to provide public access services, fixed site primary stations are placed at convenient locations, such as railway stations, banks and petrol stations. The primary stations are connected to the PSTN (Public Switched Telephone Network) and comprise a radio transceiver for communication with a roaming transportable secondary station which is also equipped with a transceiver. In CT2 a telephone call is initiated by the secondary station only. The radio link between the primary and secondary stations is a single frequency time division duplex (TDD) link. As is disclosed in MPT 1375 the transmission duplexing comprises a first time period in which the primary station transmits and the secondary station receives. This is followed after a predefined guard space by a second time period in which the secondary station transmits and the primary station receives. After another guard space the cycle is repeated.

If there are two or more primary stations mounted in close proximity a problem which arises is that unless their TDD framing structures are synchronized then it is quite likely that they will interfere with each other because when one primary station is transmitting, another primary station is receiving, and the close proximity of two or more non-synchronized transceivers will lead to interfering transmitted signals being picked-up by the switched-on receiver sections even though they are not tuned to the transmitted signal.

Synchronizing the TDD framing structures of the transceivers will significantly reduce and/or eliminate such interference. However such synchronization has to be fairly precise because MPT 1375 requires the amplitude of the RF envelope to ramp-up at such a rate that the envelope will be within 3 dB of the final amplitude at the start of the first bit transmitted at a rate of 72 kbits/second with a tolerance of ±100 ppm (parts per million) at the secondary station and ±50 ppm at the primary station. Although a master clock could be provided in the vicinity of each group of primary stations, this would not only add the cost of the fixedly sited equipments but also would require the provision of landline connections which is undesirable if for example primary stations are located on opposite sides of a road.

DISCLOSURE OF INVENTION

An object of the present invention is to be able to synchronize groups of primary stations of a cordless telephone system in a simple but effective manner.

According to one aspect of the present invention there is provided a method of operating a telephone system in which communication between fixedly sited primary stations and transportable secondary stations is by way of respective time division duplex radio links, wherein an externally produced radio signal is used to synchronize the transmit periods of the primary stations.

According to a second aspect of the present invention there is provided a primary station for use in a telephone system in which communication between the primary station and a transportable secondary station is by way of a time division duplex radio link, said primary station comprising a transceiver for communicating with a secondary station, a clock generator for controlling the switching of the transceiver between successive transmit and receive modes, means for deriving a synchronizing signal from an externally produced radio signal, said synchronizing signal being supplied to said clock generator for synchronizing the switching of the transceiver to that of at least one other primary station.

The externally produced radio signal may comprise a purposely generated signal. However the synchronizing signal may be derived from an existing signal such as the television field synchronization signal. Using an existing television signal has some advantages in that no additional spectrum is required, that it can be received virtually nationwide, and that well proven circuitry exists for deriving such a signal. The fact that, in some areas television signals are not transmitted in the early hours of the morning is not looked upon as a serious disadvantage because the usage of telephones is generally minimal during that period so that the risk of interference by nearby non-synchronized primary stations is likely to be low.

The use of an external radio signal to derive the synchronization signal means that subject to being able to receive the external radio signal the primary stations can be sited or resited in any convenient locations without the problems of rerouting landlines if a locally generated clock signal was provided.

BRIEF DESCRIPTION OF DRAWINGS

The present invention will now be described, by way of example, with reference to the accompanying drawings, wherein.

BEST MODE FOR CARRYING OUT THE INVENTION

Figure 1:
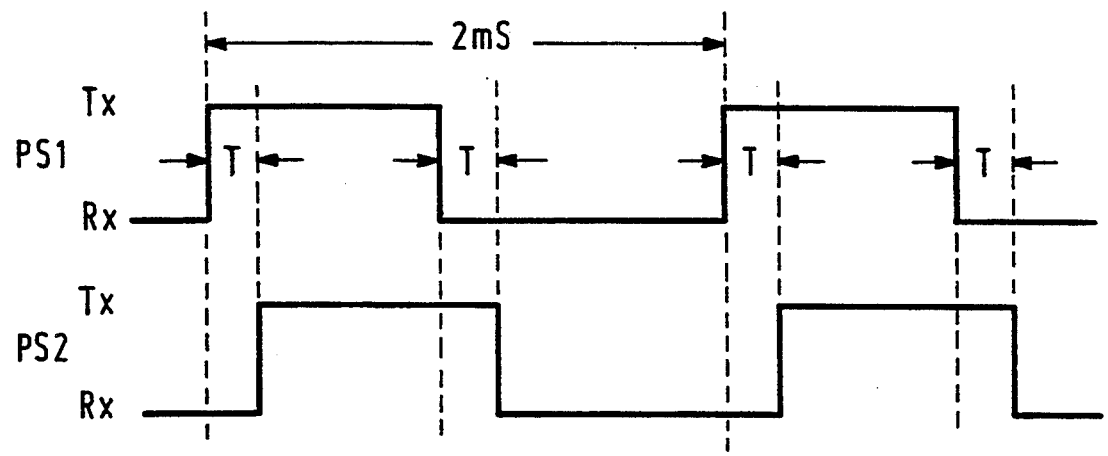
FIG. 1 is a diagram illustrating two non-synchronized TDD transmissions by two primary stations.

Referring to FIG. 1 which shows the transmission burst structure of two non-synchronized fixedly sited primary stations PS1 and PS2. The bursts are repeated every 2 mS. Following the transmission of a burst, the respective primary stations PS1, PS2 switch to receive transmissions from transportable secondary stations. When in the receive condition each of the primary stations can also pick-up interference due to transmissions from co-sited or nearby primary stations even though they are at different frequencies. CT2 specifies a channel separation of 100 KHz between adjacent single frequency TDD duplex channels. As the transmissions by the primary stations PS1 and PS2 are not synchronized, then as shown by broken lines there are successive periods T when the transmitter of one station is transmitting whilst that of the other station has switched to a receive condition. Accordingly by synchronizing the transmission periods of both primary stations PS1, PS2, such interference would be reduced or substantially eliminated.

Figure 2:
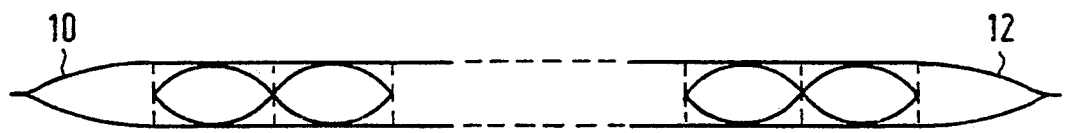
FIG. 2 is a diagram of a data packet within an RF envelope.

FIG. 2 illustrates a data packet within an RF envelope. The specification for the ramp-up 10 and the ramp-down 12 is given in CT2 and in particular the ramp-up should be such that the amplitude of the RF envelope should be within 3 dB of the final amplitude at the start of the first bit transmitted, the transmission rate for CT2 being 72 kbits/second. Accordingly the synchronization between respectively produced RF envelopes must be fairly precise in order to reduce cross interference between adjacently positioned primary stations.

In accordance with the method of the present invention the transmit periods of base stations can be framed or synchronized by means of a radio signal. A suitable currently broadcast signal is a television field synchronization signal which in Great Britain has a frequency of 50 Hz, that is one synchronization signal every 20 mS. Such a signal can be used to synchronize a 500 Hz clock generator in the primary station. However a greater accuracy can be obtained by dividing the clock period by 10 to derive clock signals every 2 mS.

Figure 3:
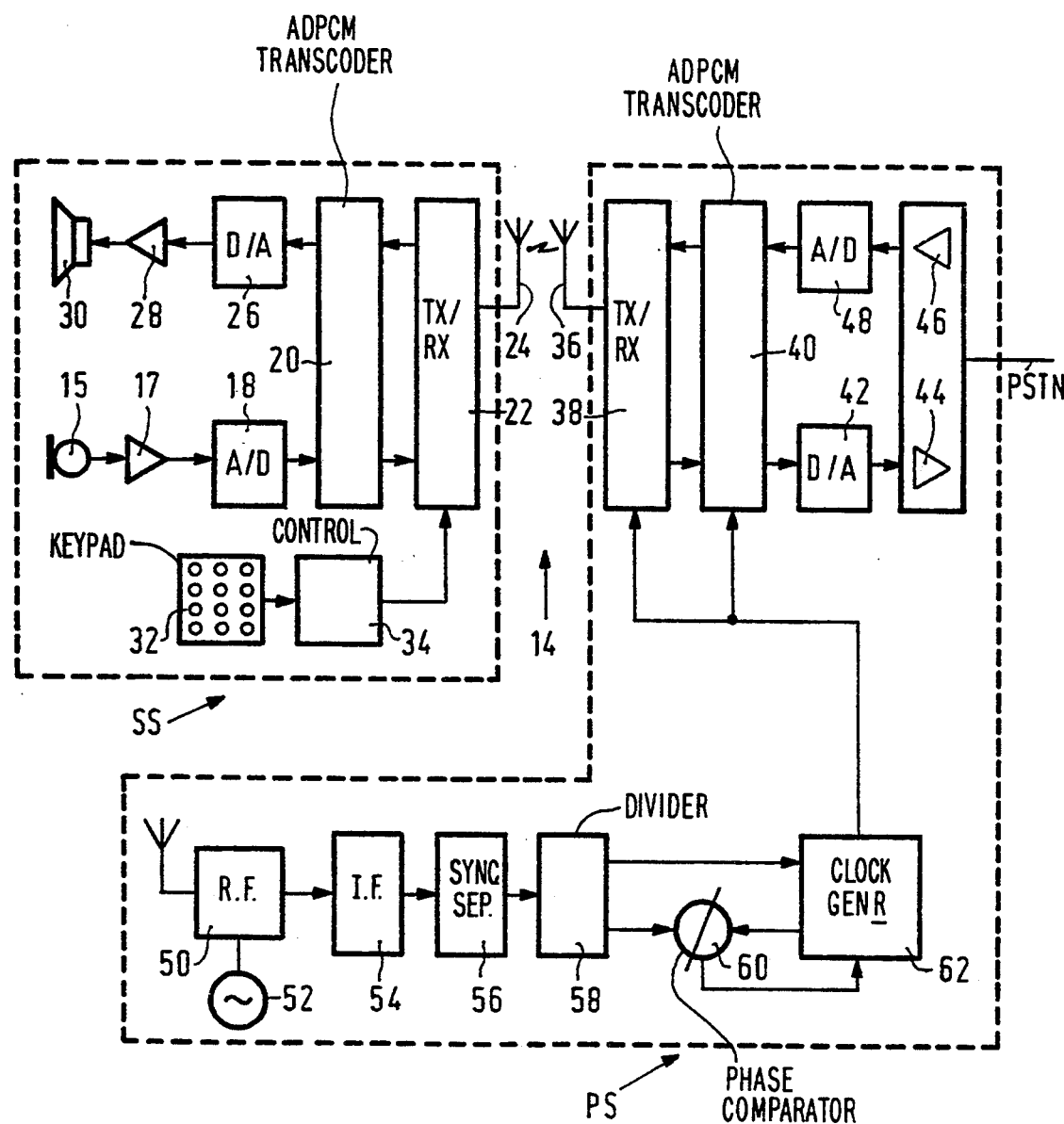
FIG. 3 is a block schematic diagram of a primary and secondary station arranged at opposite sides of an air interface.

FIG. 3 illustrates in block schematic form a fixedly sited primary station PS and a transportable secondary station SS having an air interface 14. In practice there will be a plurality of primary stations and an even larger number of roaming transportable secondary stations. In the CT2 system calls can only be initiated by secondary stations.

The secondary station SS comprises a microphone 15 connected by way of an amplifier 17 to a combined analogue to digital (A/D) converter and filter block 18 which also contains companding and CODEC functions. The output from the block 18 is supplied to an ADPCM (Adaptive Differential Pulse Code Modulation) transcoder 20 which in turn is connected to a transceiver block 22 having an antenna 24.

Signals received at the antenna 24 are, after demodulation in the transceiver 22, applied to the transcoder 20. A digital-to-analogue (D/A) filter block 26 is connected to the transcoder 20 and produces analogue speech signals which after amplification in an amplifier 28 is applied to an audio output transducer 30.

The secondary station SS also includes a keypad 32 and an associated control block 34 which enable a call to be initiated.

The primary station PS comprises an antenna 36 which is connected to a transceiver 38. An output of the transceiver 38 is applied to an ADPCM transcoder 40 whose signal output is applied by way of a D/A filter block 42 and an amplifier 44 to the PSTN.

Conversely signals from the PSTN are applied by way of an amplifier 46 and A/D filter block 48 to the transcoder 40. The data output of which is applied to the transceiver 38 for onward transmission to the secondary station SS. The call set-up procedures will not be described because one method is fully disclosed in MPT 1375.

In order to be able to derive synchronizing signals from an externally provided television field synchronizing signal, the primary station PS further comprises a known type of television receiver, for example a receiver as used in a video tape recorder, which includes an RF stage 50 to which a local oscillator 52 is connected to frequency down-convert a received signal. An IF stage 54 recovers the IF signal which is supplied to a sync. separator 56. The field synchronization pulses are recovered and applied to a pulse shaper and divider 58. The divider 58 produces pulses every 2 mS which are supplied to a phase comparator 60 and to a primary station clock signal generator 62. In order to synchronize the framing of the clock signals, an output from the generator 62 is compared with the signal already supplied to the phase comparator 60 by the divider 58 and an error signal is derived which is used to synchronize the clock signals of the respective primary station.

Synchronization circuitry could be incorporated into secondary stations but in many respects it would be superfluous because a user of a secondary station experiencing such interference can move away from the interfering secondary station.

Although the present invention has been described with reference to the CT2 system it is equally applicable to other single frequency TDD systems.

From reading the present disclosure, other modifications will be apparent to persons skilled in the art. Such modifications may involve other features which are already known in the design, manufacture and use of single frequency TDD systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A primary station for use in a cordless telephone system, in which communication between the primary station and a transportable secondary station is by way of a time division duplex radio link, said primary station comprising:

radio transceiving means for communicating with a secondary station, means for receiving a radio signal which is broadcast by a source which is external to the cordless telephone system, means for deriving a characteristic from the received radio signal, which characteristic is present in the received radio signal for a reason other than synchronizing stations in the cordless telephone system, a clock generator for controlling the switching of the radio transceiving means between successive transmit and receive periods, and means responsive to the derived characteristic for adjusting the clock generator so that the transmit period of the radio transceiving means is synchronized with those of at least one other primary station.

2. The primary station of claim 1, wherein
the means for receiving the radio signal comprises a television signal receiving means; and
the means for deriving the characteristic comprises a television field synchronizing signal separator.

3. A primary station as claimed in claim 2, wherein a divider is connected to the field synchronizing signal separator for dividing down the period between successive field synchronization signals, said divider having an output connected to said clock generator.

4. A method of operating a cordless telephone system including fixed site primary stations and moveable secondary stations, each having radio transceiving means, the method comprising the steps of:
establishing a time division duplex radio link between a primary station and a secondary station of the cordless telephone system; and
synchronizing at least two primary stations of the cordless telephone system using a characteristic of a radio signal, which radio signal is broadcast by a source external to the cordless telephone system and which characteristic used to synchronize the primary stations is present in the received signal for a reason other than synchronizing stations in the cordless telephone system.

5. A method as claimed in claim 4, in which the characteristic is a television field synchronization signal.

6. A method as claimed in claim 5, further comprising sub-dividing the period of the television field synchronization signal.

7. A method of operating a cordless telephone system including fixed site primary stations and moveable secondary stations, each having radio transceiving means, the method comprising the steps of:
establishing a time division duplex radio link between a primary station and a secondary station of the cordless telephone system; and
synchronizing at least two primary stations of the cordless telephone system using a characteristic of a radio signal, which radio signal is broadcast by a source external to the cordless telephone system for a reason other than synchronizing stations in the cordless telephone system, and the radio signal is not broadcast in a modified state to synchronize stations in the cordless telephone system.

8. A method as claimed in claim 7, in which the characteristic is a television field synchronization signal.

9. A method as claimed in claim 8, further comprising the step of sub-dividing the period of the television field synchronization signal.

* * * * *